(12) United States Patent
Mathias

(10) Patent No.: US 10,898,992 B2
(45) Date of Patent: Jan. 26, 2021

(54) FASTENING AID, FASTENING SYSTEM, CONNECTOR AND METHOD FOR FASTENING A FASTENER

(71) Applicant: Turck Inc., Plymouth, MN (US)

(72) Inventor: Marco Luke Mathias, Minneapolis, MN (US)

(73) Assignee: TURCK INC., Plymouth, MN (US)

( * ) Notice: Subject to any disclaimer, the term of this patent is extended or adjusted under 35 U.S.C. 154(b) by 112 days.

(21) Appl. No.: 16/021,074

(22) Filed: Jun. 28, 2018

(65) Prior Publication Data

US 2020/0001443 A1     Jan. 2, 2020

(51) Int. Cl.
| | |
|---|---|
| *B25B 23/142* | (2006.01) |
| *B25B 13/48* | (2006.01) |
| *B25B 13/06* | (2006.01) |
| *F16B 39/12* | (2006.01) |

(52) U.S. Cl.
CPC .......... *B25B 23/1427* (2013.01); *B25B 13/06* (2013.01); *B25B 13/48* (2013.01); *F16B 39/12* (2013.01)

(58) Field of Classification Search
CPC ..... B25B 23/1427; B25B 13/06; B25B 13/48; F16B 39/12
USPC ................................ 81/475, 457; 411/1, 6, 7
See application file for complete search history.

(56) References Cited

U.S. PATENT DOCUMENTS

| | | | | |
|---|---|---|---|---|
| 3,425,314 A | * | 2/1969 | Ohlson | F16B 31/02 411/7 |
| 4,893,977 A | * | 1/1990 | Tramezzani | F16B 39/36 411/278 |
| 5,215,336 A | * | 6/1993 | Worthing | F16L 19/005 285/319 |
| 7,011,001 B2 | * | 3/2006 | Knox | B25B 23/141 81/467 |
| 8,490,525 B2 | * | 7/2013 | Wilson | B25B 13/06 81/467 |
| 8,764,361 B2 | * | 7/2014 | Seaman | A47K 13/26 411/7 |

* cited by examiner

*Primary Examiner* — Hadi Shakeri
(74) *Attorney, Agent, or Firm* — Leydig, Voit & Mayer, Ltd.

(57) ABSTRACT

A fastening aid for screwing a fastener having a locknut by rotating the fastener around a rotation axis with a predetermined torque includes a sleeve element being attachable around the locknut along the rotation axis, an engaging structure provided at an inner surface of the sleeve and configured to engage with the locknut when the sleeve is attached around the locknut, a clasp element for reversibly closing the sleeve element to a closed state for attaching the sleeve around the locknut, and for reversibly opening the sleeve element to an opened state for detaching the sleeve from the locknut. The fastening aid is configured to allow screwing of the fastener around the rotation axis when exposed to a torque smaller than or equal to the predetermined torque and to prevent screwing the fastener around the rotation axis when the predetermined torque is exceeded.

12 Claims, 3 Drawing Sheets

FASTENING AID, FASTENING SYSTEM, CONNECTOR AND METHOD FOR FASTENING A FASTENER

FIELD

The invention generally relates to apparatuses, systems, and methods for establishing a mechanical connection between a connector and a counter part and more particularly relates to mechanical fastening aids, fasteners, fastening systems, connectors and the like that allow a fastener to be tightened at a predetermined torque.

BACKGROUND

In the field of industrial automation almost all connectors require tools to tighten a connector to its respective counter part according to its proper mating torque rating.

For instance, a torque wrench is known in prior art, which is suitable for tightening a connector or fastener with a predetermined torque. A conventional torque wrench may be adapted to grip a locknut of the fastener and operate it like a screwdriver with an audible snap mechanism once the predetermined torque is reached or exceeded. For mating or fastening the connector, the torque wrench needs to be available to its operator. In addition, several accessories might be required for using the torque wrench, which may easily get lost rendering the torque wrench unusable until the lost accessory is replaced.

Furthermore, over-molded connectors are known in prior art, as for example is provided by ESCHA BAUELEMENTE GMBH (Germany). Such a connector is provided with a fully integrated plastic locknut and a mechanism restricting the applied torque to a predetermined value. By providing an internal feature, which will slip over a build-in stop once the predetermined torque is reached, the restriction to the predetermined torque is achieved. Since the locknut is fully integrated into the connector, the amount of possible use, i.e. the number of screwing operations, is limited due to potential wear of the locknut, which is typically made of plastic materials. Furthermore, due to its full integration into the connector, a replacement of the locknut and/or the torque defining mechanism is not possible.

SUMMARY

In an embodiment, the present invention provides a fastening aid for screwing a fastener having a locknut by rotating the fastener around a rotation axis with a predetermined torque. The fastening aid comprises a sleeve element being attachable around the locknut along the rotation axis, an engaging structure provided at an inner surface of the sleeve and configured to engage with the locknut when the sleeve is attached around the locknut and a clasp element for reversibly closing the sleeve element to a closed state for attaching the sleeve around the locknut and for reversibly opening the sleeve element to an opened state for detaching the sleeve from the locknut. The fastening aid is configured to allow screwing the fastener around the rotation axis when exposed to a torque smaller than or equal to the predetermined torque and to prevent screwing the fastener around the rotation axis when the predetermined torque is exceeded.

DETAILED DESCRIPTION OF THE INVENTION

Figure 1:
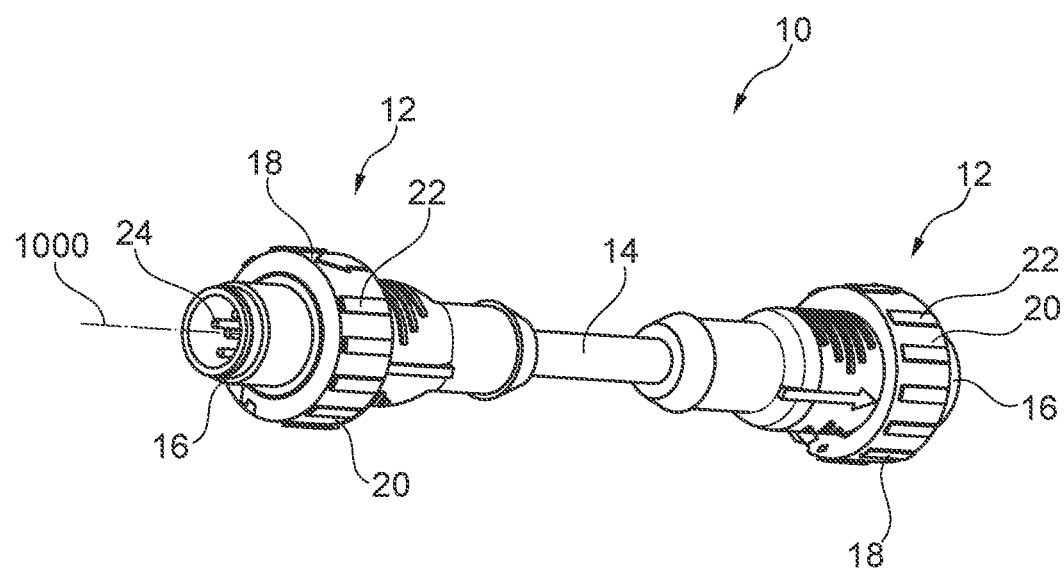
FIG. 1 is a schematic illustration of a connector system according to an embodiment of the invention.

Embodiments of the invention provide fastening aids, fastening systems, connectors, and methods for fastening fasteners. According to an embodiment, the invention provides a fastening system comprising a fastener and a fastening aid. According to another embodiment, the invention provides a connector having a fastener and a fastening aid for connecting the connector with a counter part by screwing the fastener at a predetermined torque. According to another embodiment, the invention provides a connector system comprising at least one connector and a cable attached to the connector. According to another embodiment, the invention provides a method for fastening a fastener to a counter part. The method includes rotating the fastener around the rotation axis by a fastening aid until the predetermined torque is reached or exceeded, and opening the sleeve element by disengaging the clasp element and removing the fastening aid from the fastener connected to the counter part.

Embodiments of the invention enable an operator to manually fasten a fastener or connector with a defined and/or predetermined torque by a fastening aid without requiring additional tools. In addition, embodiments of the invention allow the fastening aid to be attached and/or detached from the fastener or connector when the connector or fastener is already connected with its counter part. In particular, it is not necessary to disassemble or decouple the fastener or connector from its counter part for detaching the fastening aid from the fastener, since the fastening aid, in particular its sleeve element, can be opened for detaching it.

Furthermore, embodiments of the invention allow the fastening aid to be produced in an easy and cost-efficient way and, thus, to be provided with a fastener or connector. After connecting or fastening the connector or fastener, the fastening aid can be detached and removed from the fastener or connector.

Moreover, since the fastening aid can be attached and detached from the fastener and/or connector, a possibly worn and/or damaged and/or unusable fastening aid can be replaced by a new and/or better fastening aid. For replacing the fastening aid, the connector and/or fastener does not need to be decoupled from its counter part.

Throughout this document, a fastener relates to a mechanical device to be mechanically connected and/or coupled and/or mated to its counter part. For example, a fastener may have a threaded surface to be engaged with a threaded surface of the counter part and/or may be configured as a screw, such as a conventional M12 screw. A connector may relate to a device for establishing a mechanical and optionally an electrical connection, wherein the connector may comprise a fastener for the purpose of establishing the mechanical connection with its counter part. For instance, the connector may be configured as a plug and/or as a socket.

The rotation axis may correspond to a longitudinal axis of the fastener and/or connector, along which the fastener and/or connector is to be coupled with its counter part. As an example, the fastener may have a threaded, cylindrical surface, wherein the cylinder axis corresponds to the rotation axis.

In accordance with an embodiment of the invention, the fastening aid is configured to prevent screwing the fastener by the engaging structure being configured to allow an essential relative rotational movement between the fastening aid and the fastener when the predetermined torque is exceeded. In other words, according to this embodiment the engaging structure is configured to screw the fastener only when applying a torque, which does not exceed the predetermined torque. When a higher torque than the predetermined torque is applied, the engaging structure according to this embodiment prevents the fastening aid from screwing the fastener, for example by slipping with respect to the locknut of the fastener. This provides the advantage that simple means for setting a predetermined torque, until which the fastener can be screwed by using the fastening aid, can be set and/or defined. For instance, by adapting the engaging structure, a pre-adjustment of the predetermined torque can be achieved.

In accordance with a further embodiment, the engaging structure is configured to engage with an external structure of the locknut. Optionally the fastening aid is configured to prevent screwing the fastener by the engaging structure being configured to slip over the external structure of the locknut when the predetermined torque is exceeded. This provides the advantage, that the predetermined torque can be pre-adjusted in a simple manner.

For instance, the fastening aid may be configured to ensure a slipping of the fastening aid with respect to the locknut when the predetermined torque is exceeded while preventing a slipping while the predetermined torque is not exceeded. While not exceeding the predetermined torque, the fastening aid may be rotationally stable with respect to the locknut, i.e. not rotatable with respect to the locknut. However, according to another embodiment, the fastening aid may have a small angular range, in which the fastening aid may be rotated around the rotation axis with respect to the locknut although the predetermined torque is not exceeded. For example, if the engaging structure is provided as one or more rib elements and the external structure of the locknut is provided as a polygonal surface, a relative movement may be possible in a range until the rib element(s) get in contact with the adjacent corners of the polygonal external structure of the locknut.

In accordance with a further embodiment, at least the sleeve element and/or the engaging structure exhibit elastic mechanical properties allowing the engaging structure to slip over the external structure of the locknut when the predetermined torque is exceeded. By this, the mechanical stability and/or rigidity of the sleeve element and/or the mechanical stability and/or rigidity of the engaging structure can be adjusted to set the predetermined torque, which may be applied to the fastener or the locknut, when screwed by using the fastening aid. For instance, the sleeve element and/or the engaging structure and/or the whole fastening aid may be at least partly made of a plastic material and/or a polymeric material, such as a rubber, to provide at least partially mechanically elastic properties for pre-setting the predetermined torque. As an example, the sleeve element may comprise the material and/or be made of a thermoplastic polymer, for instance with a durometer range of 60D to 100D. The engaging structure of the locknut may comprise and/or be made for example of a metallic material, for instance of a non-ferrite metal and/or stainless steel and/or a plastic material harder than the sleeve element.

According to another embodiment, the engaging structure comprises at least one rib element extending at the inner surface of the sleeve essentially along the rotational axis. As an example, the inner surface of the sleeve element may have an essentially cylindrical shape, wherein on the lateral surface one or more rib elements are provided, which extend in longitudinal direction, i.e. perpendicular to the rotation direction. For instance, the locknut may have an external structure, which is not round but may have a polygonal, for example a squared or hexagonal, shape. When rotating the fastening aid with respect to the locknut, at least one of the one or more rib elements may mechanically contact the external structure of the locknut, i.e. one of the corners of the locknut, and transfer the torque applied to the fastening aid to the locknut and, hence, to the fastener to rotate the fastener along the rotation axis. Once the torque exceeds the predetermined torque, the at least one rib element may slip over the external structure of the locknut and, thus, prevent a further transfer of torque to the fastener. This provides the additional benefit that an acoustic and/or haptic feedback is provided to the operator that the predetermined torque has been achieved and/or exceeded.

In accordance with another embodiment, the engaging structure comprises six rib elements and is adapted to engage with an external structure of the locknut having a hexagonal shape. This provides the advantage that the torque can be transferred from the fastening aid to the locknut by six rib elements. It provides the further advantage that the fastening aid may be adapted in a simple manner to be used in combination with fasteners and/or connectors having a commonly used hexagonal locknut.

In accordance with a further embodiment, the clasp element comprises a hook and an eye, which are engageable for reversibly closing the sleeve and reversibly releasable for opening the sleeve. This allows a facilitated attachment and detachment of the fastening aid around the fastener. Moreover, this allows a secure and reliable closure of the sleeve, which is strong enough for sustaining the strain applied when fastening the fastener with the predetermined torque or even a higher torque.

According to yet another embodiment, the fastening aid further comprises a gripping structure at an outer surface of the sleeve for manually applying a torque to the fastening aid and optionally to the fastener. This provides the advantage that it allows an operator to apply the predetermined torque in a comfortable manner. Optionally, the gripping structure is configured to increase a friction between an operator's hand and the outer surface of the sleeve such as to prevent a slipping of the operator's hand off the sleeve element. Optionally, the gripping structure may be configured to provide an ergonomically comfortable surface for the operator's hand to improve the comfort and/or handling experience when using the fastening aid.

With reference to FIG. 1, a connector system 10 in accordance to an embodiment of the invention is shown, including two connectors 12 that are connected to each other by a cable 14. Although the depicted embodiment comprises only a short cable 14, longer cables 14 may be provided in accordance with other embodiments. Each of the two connectors 12 comprises a fastener 16 and a fastening aid 18 attached thereto, wherein the fastening aid 18 is arranged around the fastener 16 to surround the fastener 16 around a rotation axis 1000. The fastener 16 and the fastening aid 18 are configured to have at least partly an essentially round cross sectional shape which may be beneficial for fastening the fastener by screwing the fastener 16 around the rotation axis 1000 by the fastening aid 18.

The fastening aid comprises a sleeve element 20, which is arranged around the fastener 16 and is provided with a gripping structure 22 at its outer surface. Said gripping structure 22 according to the depicted embodiment comprises several ripples or fortifications for increasing the friction to ensure an ergonomically comfortable use and a good ability for manually applying a torque to the sleeve element 20 for screwing the fastener 16.

The engaging structure and the clasp element of the fastening aid 18 are obscured in FIG. 1 and will be discussed with reference to the following figures further below.

As can be seen, the connector further comprises several pins 24 in and around the center of the fastener, which may be adapted to establish an electrical contact with a counter part of the connector 12 when the connector 12 is connected to the counter part, wherein the electrical contact is maintained by the fastener 16 being fixed, i.e. mated or connected, to its counterpart, which may be a socket. Each of the pins 24 may be associated with a respective wire extending from the respective pin 24 through the cable 14 to a pin of the opposite connector 12 for conducting electric signals via the connector system 10 from the counterpart of the first connector 12 to the counter part of the second connector 12.

According to the depicted embodiment, the connector system 10 comprises two identical connectors 12. However, according to other embodiments, different connectors may be provided, wherein at least one of the connectors 12 is a connector 12 according to an embodiment of the invention.

As can be seen in FIG. 1, the connector is provided with the fastening aid 18 attached to the fastener 16. After fastening the fastener 16, the fastening aid 18 may remain attached to the fastener 16 or may be detached, i.e. removed, from the fastener 16, to allow or prevent a decoupling of the fastener 16 from its counter part, respectively.

Figure 2A:
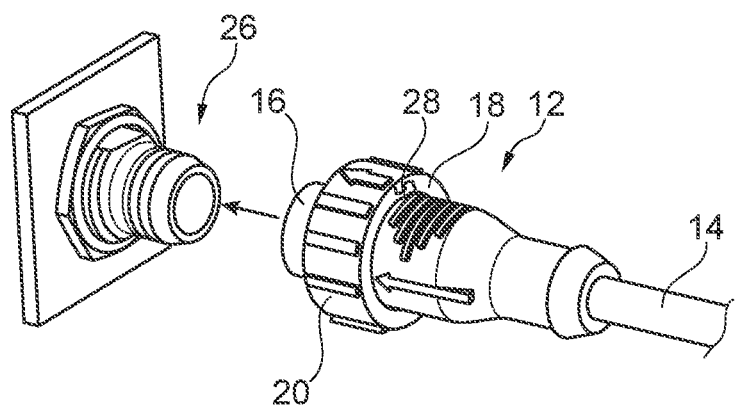
FIG. 2A is a schematic illustration of a step for bringing a connector in mechanical contact with its counter part.
Figure 2B:
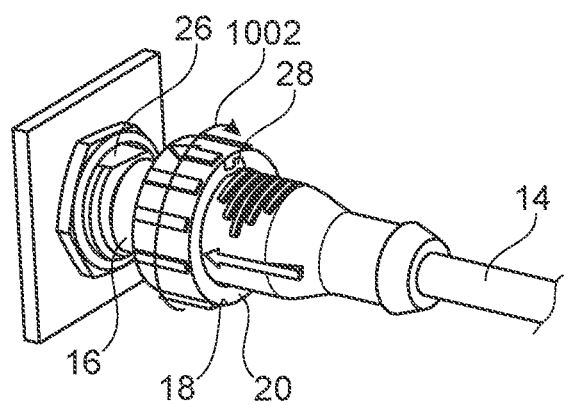
FIG. 2B is a schematic illustration of a step for fastening a fastener with a fastening aid according to an embodiment of the invention.

With reference to FIGS. 2A and 2B a method for connecting a connector 12 to its counter part is schematically described. The connector 12 resembles the connector 12 illustrated in FIG. 1. The counter part, according to the depicted exemplary embodiment, is provided by a socket 26. The socket 26 according to the depicted embodiment comprises an essentially cylindrical, externally threaded surface to be engaged with an inner surface (not shown) of the fastener 16, which for this purpose may also be threaded. In a first step, shown in FIG. 2A, the connector 12 is brought into close mechanical contact with the socket 26 by moving the connector 12 along, i.e. parallel to, the rotation axis 1000 towards the socket 26 until the fastener 16 of the connector 12 is in touch with the socket 26. In accordance with this embodiment, this mechanical contact is maintained such that there is no need to manually hold the fastener 16 in place until and while fastening the fastener 16 by the fastening aid 18.

In a second step, shown in FIG. 2B, the fastener 16 being in mechanical contact with the socket 26, is screwed, i.e. fastened, onto the socket 26 by rotating the fastener 16 in a clockwise direction 1002 around the rotation axis 1000. This is done by applying a respective torque to the fastener 16 by the fastening aid 18. For doing so, a respective torque may for instance be manually applied to the fastening aid 18, in particular to the sleeve element 20, which will rotate the sleeve element 20 and transfer the torque to the fastener 16, which will, thus, also rotate in clockwise direction 1002. As a consequence, the internal thread (not shown) of the fastener 16 engages with the threaded surface of the socket 26 and establishes a close and fixed mechanical contact between the socket 26 and the fastener 16 and, thus, establishes an electrical contact between the pins 24 and respective wires or pins (not shown) provided in the socket 26.

In an optional third step (not shown), the fastening aid 18 may be removed from the fastener without disconnecting the connector 12 from the socket 26. For doing so, a clasp element 28 provided in the sleeve element 20 may be opened, such that the fastening aid 18, in particular the sleeve element 20, may be detached from the fastener 16 in a direction perpendicular to the to the rotation axis 1000 and/or perpendicular to the clockwise direction 1002. The clasp element 28 may comprise a hook and an eye, as it is illustrated in more detail with reference to FIG. 4 further below.

Figure 3:
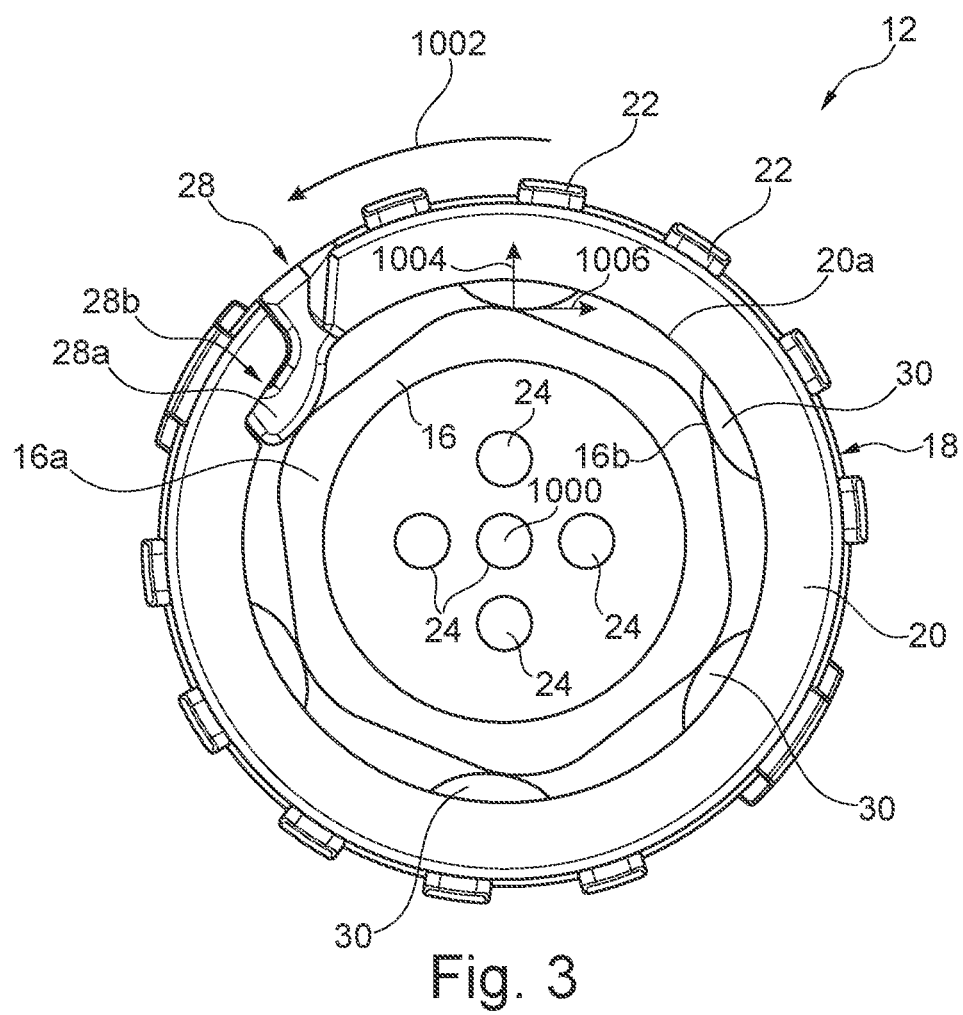
FIG. 3 is a schematic cross sectional illustration of a connector according to an embodiment of the invention.

FIG. 3 depicts a connector 12 according to an embodiment of the invention in a schematic cross sectional view, wherein the cross section relates to a cut in a plane perpendicular to the rotation axis 1000. The connector 12 resembles the connector 12 illustrated in the FIGS. 1, 2A and 2B. The connector 12 comprises a fastener 16, wherein at least in the plane of the cross section the fastener 16 is adapted as a locknut 16a. Other parts of the fastener 16 may have a different cross sectional shape and/or function, such as a round cross sectional shape, as illustrated in FIG. 1. However, the cross sectional shape of the locknut 16a deviates from a round shape to allow a facilitated application of torque in the clock wise direction 1002 to the fastener 16. In particular, according to the depicted embodiment, the locknut 16a has an external structure with a hexagonal shape, wherein the six corners 16b of the locknut 16a are each rounded. According to other embodiments different cross sectional shapes of the locknut 16a and in particular its external structure may be provided. In and around the center of the fastener 16, which coincides with the rotation axis 1000, several pins 24 are arranged for establishing an electrical contact between the connector and its counter part.

Around the fastener 16 and in particular around the locknut 16a the fastening aid 18 is attached, wherein the sleeve element 20 surrounds the locknut 16a. "Essentially surrounds" means that it is not necessarily required that the sleeve element 20 completely surrounds the locknut 16, since for example a gap may be provided for the clasp element 28. However, the fastening aid 18 optionally forms a closed structure around the locknut 16a to ensure an efficient stability for transferring torque to the locknut 16a.

The sleeve element 20 has an inner surface 20a directed towards the locknut 16a, wherein the inner surface 20a has an essentially round and optionally cylindrical cross sectional shape, from which an engaging structure 30 protrudes. The engaging structure 30 according to the depicted embodiment comprises several protrusions extending towards the rotation axis 1000 and which for example may be provided as fortifications or rib elements extending along the inner surface 20a of the sleeve element 20 in parallel to the rotation axis. The engaging structure at least partially fills a gap between the inner surface 20a of the sleeve element 20 and the external structure of the locknut 16a. However, the engaging structure 30 and/or the external structure of the locknut 16a, in particular the corners 16b, are adapted to establish a mechanical resistance to the engaging structure when getting into contact when the fastening aid 20 is rotated in clockwise direction 1002 or in counter-clockwise direction. The mechanical resistance is of such strength as to allow screwing the fastener 16 in clockwise direction 1002 and optionally in counter-clockwise direction by the fastening aid 18 with a torque up to a predetermined torque. The mechanical force acting on one or each of the rib elements of the engaging structure 30 may be divided in a radial component 1004 and a tangential component 1006 with respect to the clockwise rotation direction 1002.

When exceeding the predetermined torque, the fastening aid 18 is adapted to slip over the locknut 16a and, hence, not to transfer the torque to the locknut 16a. IN particular, the engaging structure 30 is adapted to slip over the external structure of the locknut 16a. The slipping of the fastening aid 18 over the locknut 16a when the predetermined torque is exceeded bears the advantage that a haptic and/or acoustic feedback is provided to the operator indicating that the predetermined torque is reached or exceeded. This allows the operator to decide on halting the fastening process and to understand that the fastener is fixed with the predetermined torque.

It is understood by a skilled person that the configuration of the fastening aid 18, in particular of the sleeve element 20 and/or the engaging structure 30 and their adaptation to the locknut 16a, in particular to its external structure, are essential for defining or determining the predetermined torque. In particular, the geometrical adaptation, for instance the size and/or shape and/or positioning of the engaging structure 30 with respect to the external structure of the locknut 16a and/or material properties of the sleeve element 20 and/or the engaging structure 30, such as its elasticity and/or rigidity and/or flexural modulus, define the ability of the fastening aid 18 to slip over the locknut 16a. A large spatial tolerance between the engaging structure 30 and the external structure of the locknut 16a and/or a high degree of elasticity of the sleeve element and/or of the engaging structure may promote the fastening aid 18 slipping over the locknut 18 and consequently lead to a small predetermined torque. Contrary, a small spatial tolerance between the engaging structure 30 and the external structure of the locknut 16a and/or a small degree of elasticity, i.e. a high rigidity, of the sleeve element and/or of the engaging structure may reduce the ability of the fastening aid 18 to slip over the locknut 16 and consequently result in a high predetermined torque. Due to manufacturing tolerances, the predetermined torque may relate to a certain torque range of slightly varying torque for different fastening aids 18 and/or different combinations of fastening aids 18 with fasteners 16. However, the predetermined torque may be defined or adjusted by the above-mentioned parameters influencing the predetermined torque.

The connector 12 according to the depicted embodiment comprises an engaging structure 30 having six rib elements protruding from the inner surface 20a of the sleeve element 20, wherein one of the six rib elements is provided by the clasp element 28. Having six rib elements may be advantageous when using the fastening aid 18 in combination with a fastener 16 having a hexagonal locknut 16a, as for example in the depicted embodiment, since the torque may be transferred from the sleeve element 20 to the locknut 16a at each of the corners 16b leading to the resulting torque being centered at the rotation axis 1000.

As an example, for achieving a predetermined torque of 0.6 Nm with a system according to the depicted embodiment, a geometrical interference, i.e. an overlap in radial direction, between the rib elements of the engaging structure 30 and the corners 16b of the locknut 16a, of 0.1 mm (which corresponds to about 0.004 inch) and a flexural modulus of 8.600 MPa for the sleeve element 20 comprising the engaging structure 30 can be chosen. Increasing the geometrical interference and/or increasing the flexural modulus of the sleeve element 20 will increase the predetermined torque. Likewise, reducing the geometrical interference and/or reducing the flexural modulus of the sleeve element 20 will result in a reduction of the predetermined torque.

For receiving the torque from an operator, the sleeve element 20 is provided with a gripping structure 22 having several protrusions to ensure high friction between the sleeve element 20 and the operator's hand when manually applying a torque to the fastening aid 16 by rotating it in the clockwise direction 1002.

Figure 4:
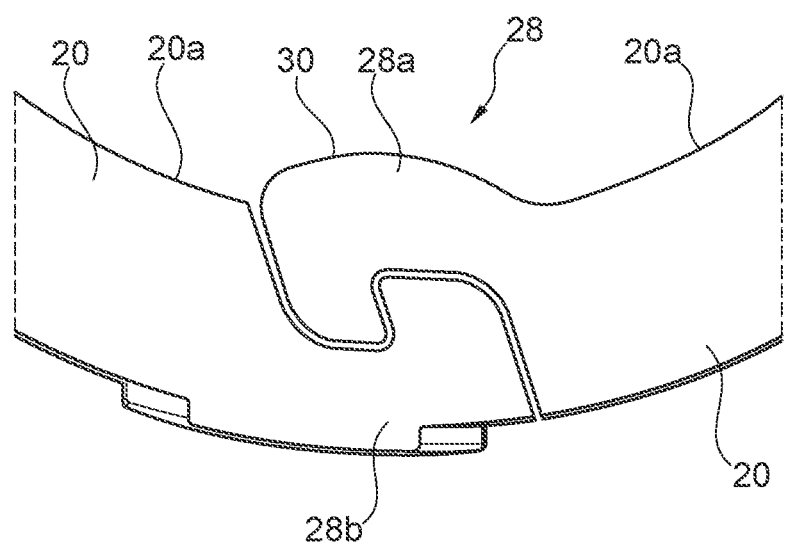
FIG. 4 is an enlarged schematic cross sectional illustration of a clasp element of a connector according to an embodiment of the invention.

FIG. 4 corresponds to a detailed cross sectional view of the clasp element 28 of the connector 12 shown in FIG. 3. According to this embodiment the clasp element 28 is adapted as a hook and eye connection, wherein the clasp connection 28 comprises a first hook 28a which is configured to engage an eye 28b or a second hook of the clasp element 28 to establish a stable mechanical connection providing the sleeve element 20 in particular with a high degree of stability in tangential direction along the clockwise rotation direction 1002. For attaching the fastening aid 18 around a fastener, the sleeve element 20 may be arranged around the fastener 16 and the clasp element 28 may be closed by engaging the hook 28a with the eye 28b bringing the sleeve element into a closed state. For detaching the fastening aid 18 from the fastener 16, the clasp element 28 may be opened by detaching the hook 28a from the eye 28b bringing the sleeve element 20 to an opened state such that the fastening aid can be detached from the fastener. This allows a facilitated attachment and/or removal of the fastener aid 18 from the fastener 16.

In accordance with the depicted embodiment, the hook 28a of the clasp element 28 is configured to provide one rib element for the engaging structure 30. By doing so, the thickness and, hence, the mechanical stability of the hook 28a can be increased while reducing the production effort, since in addition to the hook 28a only five more rib elements are required. Optionally, the clasp element 28 extends over the whole length of the sleeve element 20 in the longitudinal direction parallel to the rotation axis 1000.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 connector system
12 connector
14 cable
16 fastener
16a locknut
16b corner of the external structure of the locknut
18 fastening aid
20 sleeve element
20a inner surface of sleeve element
22 gripping structure
24 pin
26 socket
28 clasp element
28a hook
28b eye
30 engaging structure
1000 rotation axis
1002 clockwise (rotation) direction
1004 radial direction
1006 tangential direction

What is claimed is:

1. A fastening aid for screwing a fastener having a locknut by rotating the fastener around a rotation axis with a predetermined torque, the fastening aid comprising:
   a sleeve element configured to be attached around the locknut along the rotation axis;
   an engaging structure provided at an inner surface of the sleeve element and configured to engage with the locknut when the sleeve element is attached around the locknut, the engaging structure comprising a first rib element and at least a second rib element extending at the inner surface of the sleeve element along and toward the rotational axis; and
   a clasp element for reversibly closing the sleeve element to a closed state for attaching the sleeve element around the locknut, and for reversibly opening the sleeve element to an opened state for detaching the sleeve element from the locknut, the clasp element being configured to provide the first rib element,
   wherein the fastening aid is configured to allow screwing of the fastener around the rotation axis when exposed to a torque smaller than or equal to the predetermined torque and to prevent screwing of the fastener around the rotation axis when the predetermined torque is exceeded.

2. The fastening aid according to claim 1, wherein the fastening aid is configured to prevent screwing of the fastener by the engaging structure being configured to allow an essential relative rotational movement between the fastening aid and the fastener when the predetermined torque is exceeded.

3. The fastening aid according to claim 1, wherein the engaging structure is configured to engage with an external structure of the locknut, and
   wherein the fastening aid is configured to prevent screwing of the fastener by the engaging structure being configured to slip over the external structure of the locknut when the predetermined torque is exceeded.

4. The fastening aid according to claim 1, wherein at least the sleeve element and/or the engaging structure exhibit elastic mechanical properties allowing the engaging structure to slip over the external structure of the locknut when the predetermined torque is exceeded.

5. The fastening aid according to claim 1, wherein the engaging structure further comprises third, fourth, fifth, and sixth rib elements and is adapted to engage with an external structure of the locknut having a hexagonal shape.

6. The fastening aid according to claim 1, wherein the clasp element comprises a hook and an eye, which are engageable for reversibly closing the sleeve element and reversibly releasable for opening the sleeve element.

7. The fastening aid according to claim 1, further comprising a gripping structure at an outer surface of the sleeve element for exposing a torque to the fastening aid and optionally to the fastener.

8. A fastening system, comprising:
   the fastener; and
   the fastening aid according to claim 1 attached thereto.

9. A connector, comprising:
   the fastener; and
   the fastening aid according to claim 1 for connecting the connector with a counter part by screwing the fastener at the predetermined torque.

10. A connector system, comprising:
    at least one connector according to claim 9; and
    a cable attached to the at least one connector.

11. A method for fastening the fastener to a counter part, the method comprising:
    rotating the fastener around the rotation axis by the fastening aid according to claim 1 attached thereto until the predetermined torque is exceeded; and
    opening the sleeve element by disengaging the clasp element and removing the fastening aid from the fastener connected to the counter part.

12. The according to claim 11, further comprising arranging the fastening aid to the fastener such that the sleeve element is arranged around the locknut of the fastener and closing the clasp element to attach the sleeve element around the locknut.

* * * * *